United States Patent
Cha et al.

(10) Patent No.: US 7,547,744 B2
(45) Date of Patent: Jun. 16, 2009

(54) THERMOPLASTIC RESIN COMPOSITION HAVING EXCELLENT RESISTANCE AND LOW GLOSS

(75) Inventors: Jae-Hyug Cha, Daejeon (KR); Seung-Hun Chae, Daejeon (KR); Seong-Lyong Kim, Daejeon (KR); Jun-Tae Lee, Daegu (KR); Byung-Tae Yang, Yeosu-si (KR)

(73) Assignee: LG Chem, Ltd. (KR)

( * ) Notice: Subject to any disclaimer, the term of this patent is extended or adjusted under 35 U.S.C. 154(b) by 530 days.

(21) Appl. No.: 10/555,164

(22) PCT Filed: Apr. 30, 2004

(86) PCT No.: PCT/KR2004/001001
§ 371 (c)(1),
(2), (4) Date: Nov. 2, 2005

(87) PCT Pub. No.: WO2004/096909
PCT Pub. Date: Nov. 11, 2004

(65) Prior Publication Data
US 2006/0211817 A1    Sep. 21, 2006

(30) Foreign Application Priority Data

| May 2, 2003 | (KR) | .............. 10-2003-0028214 |
| May 29, 2003 | (KR) | .............. 10-2003-0034350 |
| Nov. 11, 2003 | (KR) | .............. 10-2003-0079499 |
| Feb. 19, 2004 | (KR) | .............. 10-2004-0010900 |

(51) Int. Cl.
*C08L 51/04* (2006.01)

(52) U.S. Cl. .................... 525/70; 525/73; 525/80; 525/86

(58) Field of Classification Search .......... 525/70, 525/73, 80, 86
See application file for complete search history.

(56) References Cited

U.S. PATENT DOCUMENTS

| 4,659,790 | A | | 4/1987 | Shimozato et al. ............ 526/87 |
| 4,757,109 | A | | 7/1988 | Kishida et al. ............... 524/808 |
| 5,574,105 | A | * | 11/1996 | Venkataswamy ............ 525/179 |
| 6,569,958 | B1 | * | 5/2003 | Gross et al. .................. 525/446 |
| 2001/0041760 | A1 | * | 11/2001 | Harunari et al. .............. 524/194 |
| 2004/0236020 | A1 | * | 11/2004 | Tsuji et al. ..................... 525/99 |

FOREIGN PATENT DOCUMENTS

| JP | 58-206657 | 12/1983 |
| JP | 60-192756 | 10/1985 |
| JP | 63-162708 | 7/1988 |
| JP | 63-235350 | 9/1988 |
| JP | 4-55459 | 2/1992 |
| JP | 9-59481 | 3/1997 |
| KR | 2002-0021863 | 3/2002 |
| KR | 2002-0047285 | 6/2002 |

OTHER PUBLICATIONS

Kim. STN AN: 2004:91826, abstracting KR 2002021863 (Mar. 2002).*
International Search Report for International Application No. PCT/KR2004/001001; Date of Mailing International Search Report Aug. 17, 2004 (All references cited in Search Report are listed above).

* cited by examiner

*Primary Examiner*—Jeffrey C Mullis
(74) *Attorney, Agent, or Firm*—Cantor Colburn LLP

(57) ABSTRACT

The present invention relates to a thermoplastic resin composition. In more particular, a thermoplastic resin of graft ABS polymer and heat-resistant copolymer contains acryl-based resin, peroxide-based additive, or cross-linking additive, so that the thermoplastic resin composition of the present invention is effective in processing of a colored heat resistant ABS resin by having excellent cold stress whitening reduction and strength property, without lowering other properties as well as giving excellence in hot-tool weldability, pigmentation and paint spread property which are more important in post process, and maintaining the mechanical property as well as giving excellent heat-resistance and low gloss property.

17 Claims, No Drawings

THERMOPLASTIC RESIN COMPOSITION HAVING EXCELLENT RESISTANCE AND LOW GLOSS

TECHNICAL FIELD

The present invention relates to a thermoplastic resin composition. More particularly, a thermoplastic resin of graft ABS polymer and heat-resistant copolymer contains an acryl-based resin, a peroxide-based additive or a cross-linking additive, so that the thermoplastic resin composition is provided to reduce a cold stress whitening, enhance a hot-tool weldability, pigmentation and paint spread property which are important in a post process, and maintain superior heat-resistance and mechanical property such as tensile strength, flexural strength and other properties as well as give low gloss property to thermoplastic resin itself.

BACKGROUND OF THE INVENTION

Recently, according to the demand for a lightweight automobile, in order to develop a light weight interior material, many researches to give a heat-resistance in an acrylonitrile-butadiene-styrene (ABS) resin have been developed, wherein the ABS resin has a superior impact resistance, chemical resistance, and processability, etc.

As a method for giving a heat-resistance in the ABS (acrylonitrile-butadiene-styrene) resin, a method for preparing a heat-resistant ABS by mixing a copolymer having a superior heat-resistance with a graft ABS polymer has been proposed. U.S. Pat. Nos. 3,010,936 and 4,659,790 disclose a method for preparing a heat-resistant ABS resin in which a partition or total amount of styrene used in the preparation of a heat-resistant copolymer is substituted with α-methyl styrene having a good heat-resistance. Japanese Patent Laid-open publication Nos. sho 58-206657, sho 63-162708, sho 63-235350, and U.S. Pat. No. 4,757,109 disclose a method for preparing a heat-resistant ABS resin including a maleimide compound, and a method of mixing a polycarbonate resin with the ABS, and a method of charging an inorganic material in the ABS, etc.

These heat-resistant ABS resins are generally produced as a pellet form, so that a processing step such as injection molding or extruding molding is in demand for the production of final products.

In case of preserving or transporting a heat-resistant ABS resin or a processing molded article at low temperature, especially under 0° C., an undesirable color tone change and common whitening may be occurred.

If a phenomenon known as "cold stress whitening" is happened, the original color of the molded articles is disappeared and it is especially harmful to a colored molded product.

In order to apply in a heat-resistant ABS resin or a processing molded article, the reduction degree of a cold stress whitening phenomenon should be excellent.

Therefore, the requirement of the heat-resistant ABS resin having superiority in reduction of a cold stress whitening has been increased, and as a method for preparing this thermoplastic resin, various methods for adding polyorganosiloxane of 10 to 200 ppm to thermoplastic polymer (Korean Patent Laid-open Publication No. 2002-0047285) have been developed.

Also, a heat-resistant ABS resin has many processing steps after injection molding and post-processability is important. Especially, a rear lamp housing of automobile is manufactured by injecting polymethylmethacrylate resin (PMMA), painting with thinner for even injected surface and beautiful appearance, depositing aluminum, and connecting PMMA sheets each other in constant temperature and pressure, and in painting process during the manufacturing process, if the spread property of paint is reduced, a thinner must be additionally applied, the thinner may cause the badness and waste of a painting process and the badness of a deposit appearance in an aluminum depositing process. Also, since a melting strand in hot-tool welding process is occurred, the hot-tool weldability is reduced and appearance badness is resulted due to unevenly adhesion. Therefore, a polymethylmethacrylate (PMMA) used as a rear lamp housing of automobile must be excellent in hot-tool weldability, pigmentation and paint spread property.

Also, as the level of feeling quality of users has been recently increased, the demand of a low gloss resin to perform more elegant atmosphere is increased. In addition, as environment problem comes to the front, a low gloss resin is in progress toward the direct use, abbreviating a low gloss painting or a process covering with pad.

The major principle applied to prepare this low gloss resin is that the smoothness of resin surface is controlled to be enlarged more than a visible light range, whereby the incident light is scattered, therefore, a low gloss effect is shown. The more specific methods are explained in the following three examples.

Firstly, as a method for improving an acrylonitrile-butadiene-styrene resin, the rubber particles having a large diameter of more than 2 μm, obtained through a bulk-polymerization, is used. But, the resin prepared through this method is that a low-glossy effect is insignificant, and impact strength and heat-resistance are poor.

Secondly, there is a method of introducing a low gloss filler having the particle size of more than 5 μm into a resin. The resin prepared by this method shows excellent formability, but is insufficient in low-gloss property, and especially, the deterioration of impact strength is serious.

Thirdly, there is a method for preparing a resin by using a graft-polymerization of a monomer such as ethylene-unsaturated carboxylic acid as modifier and an acrylonitrile-butadiene-styrene polymer prepared with emulsion polymerization.

The resin prepared through these methods shows an excellent low-gloss(y) property and is good in impact strength and all sorts of physical properties, therefore is widely used to give a low gloss effect onto the resin.

But, for applying it in a super heat-resistant thermoplastic resin, the heat-resistance thereof is poor. And in case of applying it in a weatherability resin such as an acrylonitrile-styrene-acrylate resin, the amount used of which is recently increased, weatherability is lowered.

DISCLOSURE OF THE INVENTION

In order to solve the above problem, an object of the present invention is to provide a thermoplastic resin composition having an excellent reduction of cold stress whitening.

Another object of the present invention is to provide a thermoplastic resin composition which is excellent in hot-tool weldability, pigmentation and paint spread property.

And, further object of the present invention is to provide a thermoplastic resin composition having an excellent heat-resistance, without lowering mechanical strength as well as having low gloss of thermoplastic resin itself.

In order to achieve above objects, the present invention provides a thermoplastic resin composition, comprising 10 to 50 parts by weight of a graft ABS polymer; 50 to 90 parts by weight of a heat-resistant copolymer; and 0.01 to 10 parts by weight of a peroxide-based additive or a cross-linking additive.

The thermoplastic resin composition may be comprised of 20 to 40 parts by weight of a graft ABS polymer of; 60 to 80 parts by weight of a heat-resistant copolymer; and 0.5 to 10 parts by weight of a peroxide-based additive.

The thermoplastic resin composition may be comprised of 20 to 40 parts by weight of a graft ABS polymer; 60 to 80 parts by weight of a heat-resistant copolymer; 0.1 to 10 parts by weight of a peroxide-based additive; and 1.0 to 10 parts by weight of an acryl-based resin.

The thermoplastic resin composition may be comprised of 10 to 50 parts by weight of a graft ABS polymer; 50 to 90 parts by weight of a heat-resistant copolymer; 0.01 to 10 parts by weight of a cross-linking additive.

The graft ABS polymer may be comprised of 40 to 70 parts by weight of conjugated diene rubber latex, 15 to 40 parts by weight of aromatic vinyl compound and 5 to 20 parts by weight of vinyl cyanide compound.

The particle sizes of the conjugated diene rubber latex is from 2,500 to 5,000 Å, the gel content is from 70 to 95%, and swelling index may be from 12 to 30.

The aromatic vinyl compound may be selected from the group consisting of styrene, α-methylstyrene, p-ethylstyrene, vinyltoluene and derivatives thereof.

The vinyl cyanide compound may be selected from the group consisting of acrylonitrile (AN), metacrylonitrile, etacrylonitrile and derivatives thereof.

The graft ABS polymer may be prepared by copolymerizing 10 to 40 parts by weight of a polybutadiene rubber latex of which the average particle diameter is from 2,500 to 3,500 Å and the gel content is from 70 to 80%, 15 to 30 parts by weight of a polybutadiene rubber latex of which the average particle diameter is from 2,500 to 3,500 Å and the gel content is from 80 to 90%, 15 to 30 parts by weight of an aromatic vinyl compound, and 10 to 25 parts by weight of a vinyl cyanide compound.

The graft ABS polymer can be prepared by the following method comprising the steps of:

(A) adding a rubber latex mixture of 20 to 30 parts by weight of a polybutadiene rubber latex of which the average particle sizes is 2,500 to 3,500 Å and the gel content is 70 to 80% and 20 to 30 parts by weight of a polybutadiene rubber latex of which the average particle sizes is 2,500 to 3,500 Å and the gel content is from 80 to 90%; 5 to 10 parts by weight of an aromatic vinyl compound, 5 to 10 parts by weight of a vinyl cyanide compound, 0.1 to 0.5 parts by weight of potassium rosinate, 0.1 to 1.0 parts by weight of a molecular weight controlling agent and 50 to 80 parts by weight of a deionized water, escalating the temperature of polymerization reactor from 40 to 60° C., and initiating polymerization by adding peroxide initiator primarily;

(B) polymerizing by adding successively for 1 to 2 hrs an emulsion containing 10 to 15 parts by weight of an aromatic vinyl compound, 10 to 15 parts by weight of a vinyl cyanide compound, 0.5 to 1.5 parts by weight of a potassium rosinate and 20 to 30 parts by weight of deionized water, as escalating slowly the temperature of polymerization reactor from 60 to 70° C., at the point of 50 to 75% of monomer conversion rate, after going on 30 to 60 minutes from the initiation of the above polymerization;

(C) adding a special peroxide initiator secondly for 1 to 2 hrs continuously as simultaneously adding the emulsion continuously; and (D) adding in a lump an activating agent accelerating the initiation reaction and thirdly peroxide initiator, followed by adding the above emulsion (B) and the above peroxide initiator (C), and escalating the temperature of polymerization reactor from 70 to 80° C. for 1 to 2 hrs, and completing polymerization.

The peroxide initiator may be inorganic peroxide.

The inorganic peroxide may be a potassium persulfate or a sodium persulfate.

The heat-resistant copolymer may be polymerized from 50 to 80 parts by weight of a α-methyl styrene (AMS) and 20 to 50 parts by weight of an acrylonitrile (AN).

The heat-resistant copolymer may be a maleimide copolymer.

The peroxide-based additive may be selected from the group consisting of dicumyl peroxide, di(t-butylperoxyisopropyl)benzene, 2,5-dimethyl-2,5-di(t-butylperoxy)hexane and 2,5-dimethyl-2,5-di(t-butylperoxy)-3-hexyne.

The cross-linking additive may be acyl peroxides, alkyl peroxides, hydroperoxides, peresters, azo compound, disulfide, or tetrazenes.

The acryl-based resin may be a polymethylmethacrylate (PMMA) having the molecular weight of 50,000 to 200,000.

The acryl-based resin may be comprised of 8 to 25 parts by weight of a polybutadiene rubber latex, 40 to 70 parts by weight of an acrylic compound, 15 to 30 parts by weight of an aromatic vinyl compound and 1 to 20 parts by weight of a vinyl cyanide compound.

The thermoplastic resin composition may be comprised of 0.1 to 5 parts by weight of a lubricant and 0.1 to 1.0 parts by weight of an anti-oxidant.

The lubricant may be selected from the group consisting of an oxidized polyethylene wax, a magnesium stearate and a mixture thereof.

The present invention will be described in detail as follows.

The present invention is characterized by selecting a peroxide-based additive as a constituent component for enhancing a mechanical strength as well as improving the reduction of a cold stress whitening of a thermoplastic resin prepared by mixing a graft ABS polymer and a heat-resistant copolymer.

That is to say, a thermoplastic resin composition having an excellent reduction of cold stress whitening according to the present invention is prepared by mixing a graft ABS polymer, a heat-resistant copolymer and a peroxide-based additive, and more specific preparing method is based on the following steps.

(1) Preparation of Graft ABS Polymer

A small particle-sized rubber latex is prepared, thereafter a large particle-sized rubber latex is prepared by coagulating the small particle-sized rubber latex, to which an aromatic vinyl compound and a vinyl cyanide compound is graft-polymerized to prepare a graft ABS polymer.

The particle size and gel content of the conjugated diene rubber latex used in the preparation of the graft ABS polymer has a very large influence on the impact strength and processability of resin. Generally, as the particle size of rubber latex becomes small, the impact resistance and processability is reduced, and as the particle size becomes large, the impact resistance improves. Also, as the gel content becomes low, polymerization is carried out in the swelling state of monomers on the inside of the rubber latex, and thus as the apparent particle size becomes larger, the impact strength is improved.

When preparing the graft ABS polymer, the graft ratio largely affects the property of the polymer. Thus, if the graft ratio is reduced, the un-grafted bare rubber latex exists, and thus the thermal stability is deteriorated. Also, as the gel content of the rubber latex is large, and as the particle diameter is large, the graft ratio is falling down, so that the improvement of thermal stability is limited.

Therefore, the method for preparing the conjugated diene rubber latex having a suitable particle diameter and gel content is very important, and when an aromatic vinyl compound and a vinyl cyanide compound are grafted in the large particle-sized rubber latex, the method for improving graft ratio is very important.

To prepare a graft ABS polymer by considering the above reasons, firstly, a small diameter conjugated diene rubber latex having a particle diameter of from 600 to 1,500, gel contents of from 70 to 95% and a swelling index of from 12 to 30 is prepared, and a large particle-sized conjugated diene rubber latex having a particle diameter of from 2,500 to 5,000 is prepared through graft-copolymerization by hot-tool welding the small particle-sized rubber latex. If the gel content of the small diameter conjugated diene rubber latex is over 70 to 95%, impact strength is reduced, if below 70, thermal stability is reduced. Also, the particle size of the conjugated diene rubber having a large diameter is major element to give a high impact property to a thermoplastic resin, so that it is preferred to be from 2,500 to 5,000 Å to satisfy the physical property of the present invention.

Hereinafter, the preparing step of a graft ABS copolymer resin is explained in detail by dividing into a preparation step of a small particle-sized rubber latex, a preparation step of a large-diameter rubber latex and a graft copolymerization step.

(a) Preparation of a Small Particle-Sized Rubber Latex

A small particle-sized rubber latex is prepared by adding and reacting for 7 to 12 hrs at 50 to 65° C., in a lump 100 parts by weight of a conjugated diene monomer, 1 to 4 parts by weight of a emulsifier, 0.1 to 0.6 parts by weight of a polymerization initiator, 0.1 to 1.0 parts by weight of an electrolyte, 0.1 to 0.5 parts by weight of a molecular weight controlling agent, 90 to 130 parts by weight of an ion exchange water in reactor, and reacting for 5 to 15 hrs at 55 to 70° C. by adding 0.05 to 1.2 parts by weight of a molecular weigh controlling agent to prepare a small diameter conjugated diene rubber latex having an average particle diameter of 600 to 1,500 Å, a gel content of 70 to 95% and a swelling index of 12 to 30.

The conjugated diene compound may be preferably an aliphatic conjugated diene compound alone, or a mixture of an aliphatic conjugated diene compound and an ethylene-based unsaturated monomer.

The emulsifier is an alkyl aryl sulfonate, an alkalimetal alkyl sulfate, a sulfonated alkyl ester, a soap of fatty acid, an alkali salt of rosinate, etc., which can be used alone or as a mixture of more than two kinds.

The polymerization initiator is an aqueous persulfate, a redox compound and a fat-solubility compound, etc. The aqueous persulfate is a sodium or potassium persulfate, etc. The redox compound is peroxy compound, sodium formaldehyde, sulfoxylate, sodium ethylenediamine, tetraacetate, ferrous sulfate, dextrose, sodium pyrrolinate, sodium sulfite etc. The fat-soluble polymerization initiator is cumene hydroperoxide, diisopropylbenzene hydroperoxide, azobis-isobutylnitrile, tert-butylhydroperoxide, paramethane hydroperoxide, benzoyl peroxide, persulfate salt, etc., which also can be used alone or as a mixture of more than two kinds.

The electrolyte can be used alone or as a mixture of more than two kinds of $KCl$, $NaCl$, $KHCO_3$, $NaHCO_3$, $K_2CO_3$, $Na_2CO_3$, $KHSO_3$, $NaHSO_3$, $K_4P_2O_7$, $K_3PO_4$, $Na_3PO_4$, $K_2HPO_4$, and $Na_2HPO_4$, etc.

The molecular weight controlling agent may be preferably mercaptan series such as t-dodecyl mercaptan, n-dodecyl mercaptan and the like.

The polymerization temperature is very important to control the gel content and the swelling index of the rubber latex, wherein the selection of initiator should be considered.

b) Preparation of the Large Particle-Sized Rubber Latex (Hot-Tool Welding the Small Particle-Sized Rubber Latex)

Generally, since the particle diameter of the large particle-sized rubber latex provides a high impact property in the thermoplastic resin, the preparation thereof is very important. The required particle diameter is preferably from 2,500 to 5,000 Å in order to satisfy the physical property in the present invention.

To 100 parts by weight of a small particle-sized rubber latex, of which a particle diameter is 600 to 1500 Å, the gel content is 70 to 95% and the swelling index is 12 to 30, is slowly added and stirred 2.5 to 4.5 parts by weight of an acetic acid solution for 1 hour to increase the particle size, and then the large particle-sized rubber latex is prepared through the hot-tool welding by stopping the agitation so as to have 2,500 to 5,000 Å of the particle diameter, 70 to 95% of the gel content, and 12 to 30 of the swelling index.

c) Graft-Polymerization

A graft ABS copolymer is prepared by graft-copolymerizing an aromatic vinyl compound and a vinyl cyanide compound to a large particle-sized rubber latex prepared through the above method.

That is to say, the grafting method is that 15 to 40 parts by weight of aromatic vinyl compound, 5 to 20 parts by weight of vinyl cyanide compound, 0.2 to 0.6 parts by weight of emulsifier, 0.2 to 0.6 parts by weight of the molecular weight controlling agent, 0.1 to 0.5 parts by weight of the polymerization initiator etc. are graft-copolymerized by adding to 40 to 70 parts by weight of the conjugated diene large particle-sized rubber latex.

The aromatic vinyl compound is preferably styrene, α-methyl styrene, o-ethyl styrene, p-ethyl styrene, vinyl toluene and derivatives thereof etc., which can be used alone or as a mixture of more than two kinds.

The vinyl cyanide compound is preferably acrylonitrile (AN), methacrylonitrile, ethacrylonitrile and derivatives thereof etc. which can be used alone or as a mixture of more than two kinds.

The emulsifier is preferably alkyl aryl sulfonate, alkali methyl alkyl sulfate, sulfonated alkyl ester, soap of fatty acid, alkali salt of rosinate etc., which can be used alone or as a mixture of more than two kinds.

The molecular weight controlling agent is preferably tertiary dodecylmercaptan.

The polymerization initiator is aqueous persulfate, redox compound and fat-solubility compound, etc. The aqueous persulfate is sodium or potassium persulfate, etc.

The redox compound is peroxy compound, sodium formaldehyde, sulfoxylate, sodium ethylenediamine, tetraacetate, ferrous sulfate, dextrose, sodium pyrrolinate, sodium sulfite etc. The fat-soluble polymerization initiator is cumene hydroperoxide, diisopropylbenzene hydroperoxide, azobis-isobutylnitrile, tert-butylhydroperoxide, paramethane hydroperoxide, benzoyl peroxide, persulfate salt etc., which can be used alone or as a mixture of more than two kinds.

When grafting, the polymerization temperature is preferably 45 to 80° C., and the polymerization time is preferably 3 to 5 hrs.

Also, a method of adding each component can be used an addition method in a lump, a multi-step addition method and a continuous addition method, in order to improve the graft ratio and minimize the formation of solid material, the multi-step adding method and the continuously adding method is preferable.

After completing the polymerization, the polymerization conversion ratio of the obtained latex is over 96%. An antioxidant and a stabilizing agent are added to the latex, and a powder is obtained by solidifying with the aqueous solution of sulfuric acid at a temperature of over 80° C., and then dehydrating and drying.

The stability of the graft copolymer latex is considered by measuring the solid type solidification part (%) as described in Equation I below.

Solid-type solidification part(%)=(the weight of a formed solid material in reactor (g)/the weight of total rubber and monomer)*100     [Equation 1]

When the solid type solidification part is over 0.7%, the stability of the latex is greatly deteriorated. In addition, obtaining a graft polymer suitable for the present invention is difficult due to the many amounts of solid material.

In addition, the graft ratio of the graft polymer is measured as follows. The graft polymer latex is obtained in a powder form by solidifying, washing, and drying. And then, 2 g of the powder is stirred for 24 hrs with the addition of 300 ml of acetone. The solution separates by using ultra-centrifuge, and the un-grafted part is obtained by dropping separated acetone solution to methanol, and the weight of the un-grafted part is measured by drying. The graft ratio is measured according to Equation 2 below using the measurement value.

Graft ratio (%)=(weight of a grafted monomer/weight of rubber)*100     [Equation 2]

The graft ratio of a graft ABS polymer in the present invention is preferably over 26%. If the graft ratio is below 26%, the graft ABS polymer is not suitable due to lowering the thermal stability.

(2) Preparation of Heat-Resistant Copolymer

A heat-resistant copolymer is prepared by copolymerizing α-methylstyrene monomer and acrylonitrile monomer with a suitable ratio. As a polymerization method, an emulsion polymerization or a mass polymerization is preferable. As an example of the preparation, 50 to 80 parts by weight of α-methylstyrene monomer, 20 to 50 parts by weight of acrylonitrile, 26 to 30 parts by weight of toluene as a solvent, 0.1 to 1.0 parts by weight of di-tert-dodecylmercaptan as a molecular weight controlling agent are mixed, thereafter the mixture thereof is successively added in a reactor, and reacted for 2 to 4 hrs. At this time, it is preferable that the reaction temperature is maintained at 140 to 170° C. This preparation process is performed by a continuous process consisting of a pump adding raw material, a continuous agitation bath, a pre-heat bath and an evaporation bath, a polymer carrying pump, and an extrusion processing instrument.

The distribution of the molecular chain structure of the obtained α-methylstyrene (AMS) and acrylonitrile (AN) copolymer is analyzed by using $^{13}C$ NMR analyzer. The analysis method is that an obtained pellet is dissolved in deuterium chloroform, and the resultant is measured by using a tetramethylsilane as an inner standard material. In the measured peaks of 140 to 150 ppm, the peak of the chain structure of α-methylstyrene-acrylonitrile-acrylonitrile (AMS-AN-AN) is shown in the range of 141 to 144 ppm, the peak of the chain structure of α-methyl styrene-α methylstyrene-acrylonitrile (AMS-AMS-AN) is shown in the range of 144.5 to 147 ppm, the peak of the chain structure of α-methylstyrene-α-methylstyrene-α-methylstyrene (AMS-AMS-AMS) is shown in the range of 147.5 to 150 ppm, and then the obtained copolymer is analyzed by measuring the area of these peaks.

The chain structure of α-methylstyrene-α-methylstyrene-α-methylstyrene (AMS-AMS-AMS) among the molecular chain structure of copolymer in the present invention is preferably less than 14%. If the chain structure thereof is over 14%, the thermal stability is reduced due to the pyrolysis of the chain structure of α-methylstyrene-α-methylstyrene-α-methylstyrene (AMS-AMS-AMS) when processing. Also, the chain structures of α-methylstyrene-acrylonitrile-acrylonitrile (AMS-AN-AN) is preferably less than 39%. If chain structure thereof is over 39, the heat-resistant property is poor.

(3) Preparation of Peroxide-Based Additive

An additive suitable for a thermoplastic resin composition having a reduced cold stress whitening is peroxide-based compound, the form thereof is preferably liquid state or flake, but is not limited to that. The peroxide-based additive may be selected from the group consisting of dicumylperoxide, di(t-butylperoxyisopropyl)benzene, 2,5-dimethyl-2,5-di(t-butylperoxy)hexane and 2,5-dimethyl-2,5-di(t-butylperoxy)-3-hexyne.

(4) Mixing Process

A thermoplastic resin composition is prepared by mixing 20 to 40 parts by weight of a graft ABS polymer, 60 to 80 parts by weight of a heat-resistant copolymer and 0.5 to 10 parts by weight of a peroxide-based additive, which are prepared in the above (1) to (3) step. In order to improve the physical property of the thermoplastic resin composition, a lubricant and an antioxidant may be added.

The content of the graft ABS polymer is preferably 20 to 40 parts by weight, more preferably 25 to 30 parts by weight.

The content of the heat-resistant copolymer is preferably 60 to 80 parts by weight, more preferably 70 to 75 parts by weight.

The content of the peroxide-based additive is preferably 0.5 to 10 parts by weight, more preferably 1.0 to 5 parts by weight.

As the lubricant, the content of an oxidized polyethylene wax, a magnesium stearate and a mixture thereof is preferably 0.1 to 5.0 parts by weight, more preferably 0.2 to 1.0 parts by weight.

The content of the antioxidant is preferably 0.1 to 1.0 parts by weight.

Also, the present invention is characterized by applying an acryl-based resin and a peroxide-based additive as a substitution component for enhancing the mechanical strength as well as improving the hot-tool weldability, pigmentation and paint spread property of the thermoplastic resin prepared by mixing a graft ABS polymer and a heat-resistant copolymer.

That is to say, the thermoplastic resin composition having a superior hot-tool weldability, pigmentation and paint spread property by the present invention is prepared by mixing a graft ABS polymer, a heat-resistant copolymer, an acryl-based resin and a peroxide-based additive. More specific preparing method by the following steps is described as follows.

(1) Preparation of Graft ABS Polymer

A method for preparing a graft ABS polymer is identical with a method for the preparation of a graft ABS polymer described in the thermoplastic resin composition having a reduced cold stress whitening.

(2) Preparation of Heat-Resistant Copolymer

A method for preparing a heat-resistant copolymer is identical with a method for the preparation of a heat-resistant copolymer described in thermoplastic resin composition having a reduced cold stress whitening.

(3) Preparation of Acryl-Based Resin

An acryl-based resin is prepared with polybutadiene rubber latex, acrylic compound, aromatic compound and vinyl cyanide compound. That is to say, the acryl-based resin is prepared by mixing 8 to 25 parts by weight of polybutadiene rubber latex, 40 to 70 parts by weight of acryl-based compound, 15 to 30 parts by weight of aromatic compound, 1 to 20 parts by weight of vinyl cyanide compound, 70 to 110 parts by weight of ion exchange water, 0.2 to 0.6 parts by weight of emulsifier, 0.2 to 0.6 parts by weight of a molecular weight controlling agent, and 0.05 to 0.3 parts by weight of a polymerization initiator for 4 to 7 hrs, wherein the polymerization temperature is preferably 65 to 80° C.

The polybutadiene rubber latex is prepared by adding in a lump 100 parts by weight of 1,3-butadiene, 1 to 4 parts by weight of emulsifier, 0.2 to 1.5 parts by weight of polymerization initiator, 0.3 to 0.9 parts by weight of electrolyte, 0.1 to 0.5 parts by weight of a molecular weight controlling agent and 60 to 100 parts by weight of ion exchange water, and reacting for 25 to 50 hrs at a temperature of 65 to 85° C. The polybutadiene rubber latex is that the average particle diameter is preferably from 2,500 to 5,000 Å, the gel content is preferably from 60 to 95%, and the swelling index is preferably from 12 to 40.

The acrylic compound may be methacrylic acid alkylester or acrylic acid alkylester.

The emulsifier is alkyl aryl sulfonate, alkali methyl alkyl sulfate, sulfonated alkyl ester, soap of fatty acid, alkali salt of rosinate etc., which can be used alone or as a mixture of more than two kinds.

The molecular weight controlling agent may be preferably tertiary dodecylmercaptan.

The polymerization initiator is the redox compound mixed with a reducing agent such as sodium formaldehyde, sulfoxylate, sodium ethylenediamine, tetraacetate, ferrous sulfate, dextrose, sodium pyrrolinate, sodium sulfite etc., or a peroxide such as cumene hydroperoxide, diisopropylbenzene hydroperoxide, persulfate salt etc., which can be used alone or as a mixture of more than two kinds.

(4) Preparation of Peroxide-Based Additive

An additive suitable for a thermoplastic resin composition having an excellent hot-tool weldability, pigmentation and paint spread property is a peroxide-based additive. The form of peroxide additive is preferably in liquid state or flake, but is not limited to that.

Examples of the peroxide-based additive are dicumyl peroxide, di(t-butylperoxyisopropyl)benzene, 2,5-dimethyl-2,5-di(t-butylperoxy)hexane and 2,5-dimethyl-2,5-di(t-butylperoxy)-3-hexyne.

(5) Mixing Process

A thermoplastic resin composition is prepared by mixing 20 to 40 parts by weight of a graft ABS polymer, 60 to 80 parts by weight of a heat-resistant copolymer, 1.0 to 10 parts by weight of an acryl-based resin and 0.1 to 10 parts by weight of an peroxide-based additive, which are prepared in the above (1) to (4) steps. To improve the physical property of thermoplastic resin composition, a lubricant and an antioxidant may be added.

The content of the graft ABS polymer is preferably 20 to 40 parts by weight, more preferably 25 to 30 parts by weight.

The content of the heat-resistant copolymer is preferably 60 to 80 parts by weight, more preferably 70 to 75 parts by weight.

The content of the peroxide-based additive is preferably 0.1 to 10 parts by weight, more preferably 0.5 to 5 parts by weight.

The content of the lubricant is preferably 0.1 to 5.0 parts by weight of oxidized polyethylene wax, magnesium stearate and a mixture thereof, more preferably 0.2 to 1.0 parts by weight.

The content of the antioxidant is preferably 0.1 to 2.0 parts by weight.

Also, the present invention is characterized by selecting a cross-linking additive as a substitution component for maintaining the physical property such as a heat-resistance and a mechanical strength as well as giving a low gloss property in a thermoplastic resin prepared by mixing the graft ABS polymer and the heat-resistant copolymer.

That is to say, the thermoplastic resin composition having an excellent heat-resistance and low gloss property by the present invention is prepared by mixing the graft ABS polymer, the heat-resistant copolymer and the cross-linking agent. More specific preparing method by the following steps is described as follows.

(1) Preparation of Graft ABS Polymer

A graft ABS polymer is prepared by graft-polymerizing aromatic vinyl compound and vinyl cyanide compound to a conjugated diene rubber latex.

That is to say, the graft ABS polymer can be prepared by mixing a rubber latex mixture, which is comprised of 20 to 30 parts by weight of polybutadiene rubber latex of which the average particle diameter is 2,500 to 3,500 Å and the gel content is 70 to 80% and 20 to 30 parts by weight of polybutadiene rubber latex of which the average particle diameter is 2,500 to 3,500 Å and the gel content is 80 to 90%; an aromatic vinyl compound, and a vinyl cyanide compound, and then an emulsion graft-copolymerization is carried out. As a result, a graft ABS polymer having a graft rate of 10 to 20% is prepared.

An example of the preparation of the above graft ABS polymer is as follows. A rubber latex mixture, comprised of 20 to 30 parts by weight of polybutadiene rubber latex of which the average particle diameter is from 2,500 to 3,500 Å and the gel content is from 70 to 80%, and 20 to 30 parts by weight of polybutadiene rubber latex of which the average particle diameter is from 2,500 to 3,500 Å and the gel content is from 80 to 90%; 5 to 10 parts by weight of aromatic vinyl compound; 5 to 10 parts by weight of vinyl cyanide compound; 0.1 to 0.5 parts by weight of potassium rosinate; 0.1 to 1.0 parts by weight of molecular weight controlling agent; and 50 to 80 parts by weight of deionized water is added in a polymerization reactor, and then the temperature of the polymerization reactor is escalated from 40 to 60° C., thereafter polymerization is initiated by adding peroxide initiator primarily.

At the point of 50 to 75% of monomer conversion rate after passing 30 to 60 minutes from the polymerization initiation, an emulsion containing 10 to 15 parts by weight of aromatic vinyl compound, 10 to 15 parts by weight of vinyl cyanide compound, 0.5 to 1.5 parts by weight of potassium rosinate and 20 to 30 parts by weight of deionized water is added continuously for 1 to 2 hrs, and simultaneously the temperature of polymerization reactor is escalated slowly from 60 to 70° C. And also, at the same time of adding the emulsion, a special peroxide initiator is continuously added secondly for 1 to 2 hrs. After adding the emulsion and the peroxide initiator, an activating agent accelerating initiation reaction and a thirdly peroxide initiator are added in a lump, and the temperature of polymerization reactor is slowly escalated from 70 to 80° C. for 1 to 2 hrs, and then polymerization is completed.

According to the above method for preparing a graft ABS polymer, a total polymerization time is approximately 3 to 7 hours, and a polymerization conversion rate is over 96%.

The conjugated diene rubber latex can be selected from aliphatic conjugated diene compound alone or a mixture of an aliphatic conjugated diene compound and an ethylene unsaturated compound, and among them, polybutadiene rubber latex is more preferable.

The aromatic vinyl compound may be styrene, α-methylstyrene, p-methylstyrene, α-ethylstyrene, o-ethylstyrene, p-ethylstyrene, vinyltoluene and derivatives thereof, etc., which can be used alone or as a mixture of more than two kinds, and styrene is more preferable.

The vinyl cyanide compound may be acrylonitrile, methacrylonitrile, ethacrylonitrile, derivative thereof etc., which can be used alone or as a mixture of more than two kinds, and among them, acrylonitrile is more preferable.

Beside the above described monomers, a graft ABS polymer of the present invention may be copolymerized with a small amount of vinyl monomer such as maleimide, N-methylmaleimide, N-ethylmaleimide, N-propylmaleimide, N-phenylmaleimide, methyl methacrylate, methyl acrylate, butyl acrylate, acrylic acid, maleic anhydride and the like.

An emulsifier for emulsion added for preparing a graft ABS copolymer may be an anionic emulsifier, a cationic emulsifier, a nonionic emulsifier or a mixture thereof.

The anionic emulsifier may be alkyl aryl sulfonate, alkali methyl alkyl sulfate, sulfonated alkylester, soap of fatty acid, alkali salt of rosinate etc., and the content thereof is 0.6 to 2.0 parts by weight.

The molecular weight controlling agent used for preparing a graft ABS polymer of the present invention is preferably mercaptan, and tert-dodecylmercaptan is more preferable.

The content of the molecular weight controlling agent is preferable 0.1 to 1.0 parts by weight.

A peroxide initiator added for preparing a graft ABS polymer is preferably inorganic peroxide such as potassium persulfate, sodium persulfate and the like. The content of the peroxide initiator is preferably 0.05 to 0.5 parts by weight, which is preferably used through dividing three times. That is to say, it is preferable that in the initiation process of polymerization, 30 to 50 parts by weight of the total amount of peroxide initiator is used, and in the progress process thereof, 30 to 50 parts by weight of the total amount of peroxide initiator is used, and before the termination process thereof, 10 to 20 parts by weight of the total amount of peroxide initiator is used.

The graft ABS polymer polymerized by the above described method is coagulated with a common coagulant such as sulphuric acid, magnesium sulfate ($MgSO_4$), calcium chloride ($CaCl_2$), aluminum sulfate ($Al_2(SO_4)_3$), thereafter washed, dehydrated and dried to obtain a powdery state.

(2) Preparation of Heat-Resistant Copolymer

A heat-resistant copolymer is prepared by the same method as a method for preparing a heat-resistant copolymer described in a thermoplastic resin composition having reduced cold stress whitening.

Also, as the heat-resistant copolymer of the present invention, a maleimide-based heat-resistant copolymer can be used.

(3) Preparation of Cross-Linking Additive

An additive suitable for thermoplastic resin having a superior heat-resistance and low gloss property is a cross-linking additive. The form of the cross-linking additive is not especially limited, but liquid state or flake is preferable.

The cross-linking additive may be selected from acyl peroxides, alkyl peroxides, hydroperoxides, peresters, azo compound, disulfide, tetrazenes, etc.

The peroxide-based compound may be dicumyl peroxide, di(t-butylperoxyisopropyl)benzene, 2,5-dimethyl-2,5-di(t-butylperoxy)hexane, 2,5-dimethyl-2,5-di(t-butylperoxy)-3-hexyne, etc.

By adding these cross-linking additives during the preparation of a thermoplastic resin, a radical is formed while resin processing, the cross-linking reaction is progressed by the formed radical, and thus a thermoplastic resin shows a low gloss property.

(4) Mixing Process

A thermoplastic resin composition is prepared by mixing 10 to 50 parts by weight of the graft ABS polymer, 50 to 90 parts by weight of the heat-resistant copolymer and 0.05 to 10 parts by weight of cross-linking additive, which are prepared through the above (1) to (3) steps. In order to improve the physical property of thermoplastic resin composition, a lubricant and an antioxidant may be further added.

The content of the graft ABS polymer is preferably 10 to 50 parts by weight, more preferably 25 to 30 parts by weight.

The content of the heat-resistant copolymer is preferably 50 to 90 parts by weight, more preferably 70 to 75 parts by weight.

The content of the cross-linking additive is preferably 0.05 to 10 parts by weight, more preferably 0.1 to 1.0 parts by weight.

The lubricant may be oxidized polyethylene wax, magnesium stearate and a mixture thereof, and among them, ethylene bisstearamide (EBA) is more preferable. The content of the lubricant is preferably 0.1 to 5.0 parts by weight, more preferable 0.1 to 2.0 parts by weight.

The content of the antioxidant is preferably 0.1 to 1.0 parts by weight.

A thermoplastic resin prepared by the above described method is that the surface gloss measured by the ASTM D-523 is less than 25 at an angle of 45 degree, and heat-resistance is excellent.

BEST MODE FOR CARRYING OUT THE INVENTION

Hereinafter, the present invention is described in more detail through the following examples. However, the scope of the present invention is not limited to the following examples. Also, the evaluation of physical property to rubber latex and final resins prepared through the following examples and comparative examples was carried out by the following methods.

Gel content and swelling index: A rubber latex was solidified with dilution acid or metal salt, and the solidification was washed and dried in a vacuum oven for 24 hrs at 60° C. The obtained rubber mass was cut into small pieces with scissors, and 1 g of the rubber slice was added to 100 g of toluene, and then was stored in a dark room at room temperature for 48 hrs. The resultant was separated to sol and gel, and then the gel content and swelling index of each was measured according to Equations 3 and 4 below.

Gel content (%)=(weight of insoluble part (gel)/weight of sample)*100    [Equation 3]

Swelling index=weight of swelled gel/weight of the gel    [Equation 4]

Particle diameter: it was measured by the dynamic laser-light scattering method using Nicomp (Model: 370HPL).

Weight average molecular weight (Mw) and Distribution of molecular weight (Mw/Mn): Non solvent was added to a sol part separated when measuring the graft ratio, and extracted and dried to obtain a styrene-based copolymer.

The styrene-based copolymer was dissolved in THF and the weight average molecular weight (Mw) and distribution of molecular weight (Mw/Mn) was measured by using GPC (Gel Permeation Chromatography).

Graft ratio: It is a percentage of the weight of styrene-based copolymer grafted to 1 g of rubber. 2 g of the powdery graft ABS polymer is stirred for 24 hrs with the addition of 100 ml of acetone. The un-grafted styrene-based copolymer is dissolved, and a sol and a gel were separated by using an ultra-centrifuge, and the weight of the un-grafted part is measured. The graft ratio is calculated according to Equation 5 below. The rubber content of Equation 5 is a percentage to a graft ABS polymer of a rubber latex added in polymerization process.

Graft ratio (%)=(weight of gel−(ABS polymer*rubber content))/(ABS polymer*weight of rubber)*100  [Equation 5]

Tensile strength: measured according to ASTM D638.
Flexural strength: measured according to ASTM D790.
Impact strength: measured according to ASTM D256.
Degree of cold stress whitening: Commonly executed color coordinate was measured, and henceforth, the degree of cold stress whitening is determined by calculating color deviation, dE. More than 3 of dE mean that a severe cold stress whitening was occurred and generally it was got out of a permitted limit.
Hot-tool weldability: Resin was melted at a temperature of 320° C. with the pressure of 5 bar for 60 sec, a fusing strength between a resin and a metal side was evaluated. That is to say, the degree of the hot-tool weldability was evaluated with the thickness and dimension of strand generated, after resin was contacted with metal side. Under the same hot-tool welding condition, if a strand is thick and plentiful, a hot-tool welding strength falls, and if a strand is thin and does not exist, hot-tool welding strength is good. The condition of not existing strand is an A-grade, and the condition of generating strand in all over is a C-grade. The hot-tool weldability was evaluated correlatively depending on the number and thickness of strand.
Pigmentation of paint: Commonly executed color coordinate was measured, and henceforth, degree of pigmentation was determined by measuring L value.
Paint spread property: Paint spread property shows the degree of paint spread on heat-resistant ABS surface in a painting process, it is important in wetting of surface and paint, which was confirmed by measuring a surface energy.
Heat-resistance: Heat Deflection Temperature (HDT) was measured according to ASTM D648
Low gloss property: Surface gloss was measured according to ASTM D523

EXAMPLE 1 TO 9 and COMPARATIVE 1

Preparation of Thermoplastic Resin Having Reduced Cold Stress Whitening

Example1

A First Step: Preparation of Graft ABS Polymer
(a) Preparation of a Small Particle-Sized Rubber Latex:
100 parts by weight of ion exchange water, 100 parts by weight of 1,3-butadiene as a monomer, 1.2 parts by weight of potassium rosinate as an emulsifier, 1.5 parts by weight of potassium oleate, 0.1 parts by weight of sodium carbonate ($Na_2CO_3$) as an electrolyte, 0.5 parts by weight of $KHCO_3$, and 0.3 parts by weight of tert-dodecyl mercaptan (TDDM) as a molecular weight controlling agent were introduced in a lump to a nitrogen-substituted polymerization reactor (autoclave). The reaction temperature was raised to 55° C., and then the reaction was initiated by adding in a lump 0.3 parts by weight of potassium sulfite as an initiator in the reactor, and reacted for 10 hrs. Thereafter, 0.05 parts by weight of tert-dodecyl mercaptan (TDDM) was further added to the reactant, and then the temperature is raised to 65° C., and reacted for 8 hrs. to obtain the small particle-sized rubber latex. The particle diameter of the obtained rubber latex was 1,000 Å, and the gel content thereof was 90%, and the swelling index thereof was 18.

(b) Preparation of a Large Particle-Sized Rubber Latex (Hot-Tool Welding Process of the Small Particle-Sized Rubber Latex)
100 parts by weight of the prepared small particle-sized rubber latex, prepared in the above (a), was added in the reactor, and the stirring speed was controlled to 10 rpm, and the temperature was controlled to 30° C., and then 3.0 parts by weight of aqueous solution 7 wt % of acetic acid was slowly added in the reactor for 1 hr. Thereafter, the agitation was stopped, and the conjugated diene latex having a large diameter was prepared through a hot-tool welding of the small particle-sized rubber latex by leaving the resultant for 30 min. The particle diameter of the large particle-sized rubber latex was 3,100 Å, and the gel content thereof was 90%, and the swelling index thereof was 17.

(c) Grafting Step (Preparation of a Graft ABS Copolymer):
50 parts by weight of the large particle-sized rubber latex prepared in the above (b), 65 parts by weight of ion exchange water, 0.35 parts by weight of potassium rosinate as an emulsifier, 0.1 parts by weight of sodium ethylene diamine tetra acetate, 0.005 parts by weight of ferrous sulfate, and 0.23 parts by weight of formaldehyde sodium sulfoxylate were introduced in a lump to a nitrogen-substituted polymerization reactor, and the temperature was raised to 70° C. The mixed emulsion solution, composed of 50 parts by weight of ion exchange water, 0.65 parts by weight of potassium rosinate, 35 parts by weight of styrene, 15 parts by weight of acrylonitrile, 0.4 parts by weight of tert-dodecylmercaptan, and 0.4 parts by weight of diisopropylenehydroperoxide, was continuously added to the reactant for 3 hrs, and the temperature was raised to 80° C., and then the reaction was completed by aging for 1 hr.

Wherein, the polymerization conversion ratio was 97.5%, and the solid type solidification part was 0.2%, and the graft ratio was 37%. This graft ABS polymer was solidified with an aqueous solution of sulfuric acid, and washed, thereafter the powder was obtained.

A Second Step: Preparation of Heat-Resistant Copolymer
A mixture of 70 parts by weight of α-methyl styrene, 30 parts by weight of acrylonitrile, 30 parts by weight of toluene as solvent and 0.15 parts by weight of di-tert-dodecylmercaptan as the molecular weight controlling agent were continuously introduced to the reactor, wherein the reaction time was set to 3 hrs, and the reaction temperature was maintained at 148° C. The discharged polymerization solution from the reactor was heated in a preheater, and the un-reacted monomer was volatilized in evaporation reactor, and then the temperature of the polymer was maintained at 210° C. Thereafter, the heat-resistant copolymer (SAN type copolymer) was processed in a pellet form by using a transfer pump extrusion molding.

A Third Step: Mixing
30 parts by weight of graft ABS polymer prepared by the first step, 70 parts by weight of SAN copolymer prepared by the second step, 1.0 parts by weight of dicumyl peroxide (Perkadox BC, Perkadox BC-FF, Akzo noble) as a peroxide additive against a rubber content, 1.0 parts by weight of ethylene bisstearamide (EBA) as a lubricant and 0.3 parts by weight of an antioxidant were mixed. And then, the pellet was prepared by using a double screw extruder at 230° C.

A Fourth Step: Physical Property Evaluation

The pellet prepared by the third step is injected again and tensile strength, flexural strength and the degree of cold stress whitening are measured, and the result is shown in Table 1.

Example 2

A thermoplastic resin composition was prepared by the same steps as example 1, except using di-(tert-butylperoxy-isopropyl)benzene as a peroxide-based additive, and tensile strength, flexural strength and the degree of cold stress whitening were measured, and the result is shown in Table 1.

Example 3

A thermoplastic resin composition was prepared by the same steps as example 1, except using 2,5-dimethyl-2,5-di(t-butylperoxy)hexane as a peroxide-based additive, and tensile strength, flexural strength and the degree of cold stress whitening were measured, and the result is shown in Table 1.

Example 4

A thermoplastic resin composition was prepared by the same steps as example 1, except using 3 parts by weight of the peroxide-based additive of example 2 against a rubber content, and tensile strength, flexural strength and the degree of cold stress whitening were measured, and the result is shown in Table 1.

Example 5

A thermoplastic resin composition was prepared by the same steps as example 1, except using 5 parts by weight of the peroxide-based additive of example 3 against a rubber content, and tensile strength, flexural strength and the degree of cold stress whitening were measured, and the result is shown in Table 1.

Comparative Example 1

A thermoplastic resin composition was prepared by the same steps as example 1, except not using a peroxide additive, and tensile strength, flexural strength and the degree of cold stress whitening were measured, and the result is shown in Table 1.

As shown in Table 1, the thermoplastic resin composition of examples 1 to 9 prepared with a constant constitution of graft ABS polymer, heat-resistant copolymer and peroxide-based additive according to the present invention is excellent in strength property of tensile strength, flexural strength, etc. compared to comparative example 1 not adding peroxide-based additive.

Also, as for the degree of cold stress whitening, the higher a dE value is, the worse a cold stress whitening is. The dE value of the thermoplastic resin composition of examples 1 to 9 is 1.7 to 3.8, so that it can be known that the reduction of cold stress whitening is improved to 70 to 90%.

EXAMPLES 10 to 14 and COMPARATIVE EXAMPLE 2

Preparation of Thermoplastic Resin Having Superior Hot-Tool Weldability, Pigmentation and Paint Spread Property Example 10

A First Step: Preparation of Graft ABS Polymer

A graft ABS polymer was prepared by the same method as a first step of example 1.

A Second Step: Preparation of Heat-Resistant Copolymer

A heat-resistant copolymer was prepared by the same method as a second step of example 1.

A Third Step: Preparation of Acryl-Based Resin 100 parts by weight of 1,3-butadiene, 80 parts by weight of ion exchange water, 1.2 parts by weight of potassium rosinate as an emulsifier, 1.5 parts by weight of potassium oleate, 0.7 parts by weight of sodium carbonate ($Na_2CO_3$) as an electrolyte, 0.8 parts by weight of potassium hydrogencarbonate and 0.3 parts by weight of tert-dodecyl mercaptan (TTDM) as a molecular weight controlling agent were introduced in a lump to a nitrogen-substituted polymerization reactor, and the temperature was controlled to 65° C. 0.3 parts by weight of potassium persulfate as polymerization initiator was further added, and the reaction temperature was continuously increased to 85° C. for 35 hrs, and then the reaction was completed to prepare a polybutadiene rubber latex.

10 parts by weight of prepared polybutadiene rubber latex, 90 parts by weight of ionexchange water, 0.2 parts by weight of sodium oleate as an emulsifier, 14.38 parts by weight of methylmethacrylate as an acrylic monomer, 5.62 parts by weight of styrene as an aromatic vinyl monomer, 2.5 parts by weight of acrylonitrile as a vinyl cyanide monomer, 0.2 parts by weight of tert-dodecyl mercaptan as a molecular weight

TABLE 1

|  | Examples | | | | | | | | | Comparative Example |
| --- | --- | --- | --- | --- | --- | --- | --- | --- | --- | --- |
|  | 1 | 2 | 3 | 4 | 5 | 6 | 7 | 8 | 9 | 1 |
| Tensile strength (kg/fcm$^2$) | 510 | 510 | 510 | 510 | 520 | 520 | 530 | 530 | 520 | 470 |
| Flexural strength (kg/fcm$^2$) | 850 | 870 | 860 | 870 | 880 | 890 | 880 | 890 | 890 | 800 |
| Degree of cold stress whitening (dE) | 3.5 | 3.8 | 3.2 | 2.8 | 2.3 | 2.4 | 2.0 | 1.9 | 1.7 | 12.5 | controlling agent, 0.048 parts by weight of sodium pyrrolinate as a polymerization initiator, 0.012 parts by weight of dextrose, 0.001 parts by weight of ferrous sulfate, 0.04 parts by weight of cumene hydroperoxide were introduced in a lump at 50° C., and reacted as increasing the temperature to 73° C. for 2 hrs.

After reacting, an emulsion mixed of 70 parts by weight of ionexchange water, 0.4 parts by weight of sodium oleate, 43.12 parts by weight of methymethacrylate, 16.88 parts by weight of styrene, 7.5 parts by weight of acrylonitrile, 0.25 parts by weight of tert-dodecyl mercaptan, 0.048 parts by weight of sodium pyrrolinate, 0.012 wt part of dextrose, 0.001 parts by weight of ferrous sulfate, and 0.10 parts by weight of cumene hydroperoxide was continuously introduced for 4 hrs, and the temperature is increased to 76° C. again, and the resultant was aged for 1 hr, and then the reaction was completed to prepare acryl-based resin. The powdery form was obtained by coagulating with calcium chloride solution and washing. Wherein polymerization conversion rate was 99.5% and solid type solidification part was 0.1%.

A Fourth Step: Mixing 30 parts by weight of graft ABS copolymer prepared in a first step, 70 parts by weight of heat-resistant prepared in a second step, 1 parts by weight of acryl-based resin prepared in a third step, 0.1 parts by weight of dicumyl peroxide (Perkadoc BC, Perkadox BC-FF) as peroxide-based additive against a rubber content, 1 parts by weight of ethylene bisstearamide (EBA) as a lubricant and 0.3 parts by weight of antioxidant were mixed. And then, the pellet was prepared by using a double screw extruder at 230° C.

Example 11

A thermoplastic resin was prepared by the same method as example 10, except using 5 parts by weight of acryl-based resin.

Example 12

A thermoplastic resin was prepared by the same method as example 10, except using 1 parts by weight of peroxide-based additive of example 10.

Example 13

A thermoplastic resin was prepared by the same method as example 10, except using 80 parts by weight of heat-resistant copolymer.

Example 14

A thermoplastic resin was prepared by the same method as example 10, except using 3 parts by weight of acryl-based resin, 3 parts by weight of peroxide-based additive of example 10. And hot-tool weldability, pigmentation of paint, surface energy, tensile strength, flexural strength were measured, and the result is shown in Table 2.

Comparative Example 2

A thermoplastic resin was prepared by the same method as example 10, except not using acryl-based resin and peroxide-based additive, and hot-tool weldability, pigmentation of paint, surface energy, tensile strength, flexural strength were measured, and the result is shown in Table 2.

TABLE 2

| Classification | Example 14 | Comparative example 2 |
|---|---|---|
| Hot-tool weldability | A | C |
| Pigmentation of paint (45 degree gloss data, L) | 78.2 | 80.1 |
| Surface energy (mN/m) | 56.1 | 50.7 |
| Tensile strength (kg/fcm$^2$) | 630 | 470 |
| Flexural strength (kg/fcm$^2$) | 1050 | 800 |

As shown in Table 2, the thermoplastic resin composition of example 5 prepared with a constant constitution of graft ABS polymer, heat-resistant copolymer, acryl-based resin and peroxide-based additive according to the present invention was remarkably excellent in tensile strength, flexural strength as well as having a superior hot-tool weldability, pigmentation and paint spread property (surface energy), compared to comparative example 1, not adding acryl-based resin and peroxide-based additive. Wherein, the hot-tool weldability is that A-grade is better than C-grade, and in pigmentation of paint, the smaller a L value is, the better the degree of pigmentation is, and in paint spread property, the higher the surface energy value is, the better paint spread property is.

EXAMPLE 15 TO 21 AND COMPARATIVE EXAMPLE 3 TO 4

Preparation of Thermoplastic Resin Having Superior Heat-Resistance and Low Gloss Property Example 15

A First Step: Preparation of Graft ABS Polymer 30 parts by weight of polybutadiene rubber latex of average particle diameter of 3,100 Å and gel content of 75%, 25 parts by weight of polybutadiene rubber latex of average particle diameter of 3,100 Å and gel content of 86%, 145 parts by weight of ion exchange water, 2.9 parts by weight of acrylonitrile, 9.1 parts by weight of styrene, 0.5 wt part of potassium rosinate and 0.1 parts by weight of tert-dodecylmercaptan were introduced to polymerization reactor equipped with heating system. The reaction temperature was raised to 60° C., and then the polymerization reaction was initiated by adding 0.1 parts by weight of potassium sulfite as an initiator in the reactor. After the polymerization was initiated, the temperature was increased to 70° C. for 60 min. At this time, the polymerization conversion rate was 73%.

Emulsion containing 7.9 parts by weight of acrylonitrile, 25.1 parts by weight of styrene, 25 parts by weight of ionexchange water, and 0.9 parts by weight of potassium rosinate was prepared in separated mixing machine and introduced continuously into the polymerization reactor for 2 hrs. Also, an emulsion containing monomer and 0.15 parts by weight of special potassium persulfate were introduced continuously into the reactor for 2 hrs, wherein the reaction temperature was maintained to 70° C.

After adding the emulsion containing monomer, 0.05 parts by weight of potassium persulfate was added in a lump to a polymerization reactor, and the temperature was raised to 80° C. for 1 hr., and then polymerization reaction was completed. The reaction conversion rate was 99%.

Antioxidant was added to a graft ABS polymer obtained by the completion of polymerization reaction, and coagulated with 10% sulphuric acid solution, and then washed and dried to prepare graft ABS polymer of powdery form.

A Second Step: Preparation of Heat-Resistant Copolymer

A mixture of 70 parts by weight of α-methylstyrene, 30 parts by weight of acrylonitrile, 30 parts by weight of toluene as a solvent and 0.15 parts by weight of di-tert-dodecylmercaptan parts as a molecular weight controlling agent were continuously introduced in the reactor, and the temperature was maintained at 148° C., and the reaction time was 3 hrs. The discharged polymerization solution in the reactor was heated in a preheater, the un-reacted monomer was volatilized in evaporation reactor, and then the temperature of the polymer was maintained at 210° C. Thereafter, the heat-resistant copolymer (SAN type copolymer) was processed in a pellet form by using a transfer pump extrusion molding.

A Third Step: Mixing 1.0 parts by weight of ethylene bisstearamide (EBA) as lubricant and 0.3 parts by weight of antioxidant was added and mixed in 30 parts by weight of graft ABS polymer prepared by the first step and 70 parts by weight of SAN copolymer prepared by the second step and 0.1 parts by weight of dicumyl peroxide as peroxide-based additive. And, then the pellet was prepared by using a double screw extruder at 230° C.

A Fourth Step: Physical Property Evaluation

Pellet prepared by a third step was injected again and heat deflection temperature (HDT), surface gloss, impact strength, tensile strength and flexural strength were measured, and the result is shown in Table 3.

Example 16

A thermoplastic resin was prepared by the same method as example 15, except using 2.4 parts by weight of acrylonitrile and 9.6 parts by weight of styrene and preparing 6.6 parts by weight of acrylonitrile and 26.4 parts by weight of styrene of emulsion containing monomer in the polymerization initiation step of a first step of preparation of a graft ABS polymer. Heat deflection temperature (HDT), surface gloss, impact strength, tensile strength and flexural strength were measured, and the result is shown in Table 3.

Example 17

A thermoplastic resin was prepared by the same method as example 15, except using mixed polymer comprising 30 parts by weight of a n-phenylmaleimide heat resistant SAN polymer as a heat resistant copolymer, which was a terpolymer consisted of 38% by weight of n-phenylmaleimide, 53% by weight of styrene and 9 parts by weight of acrylonitrile, and 35 parts by weight of commonly SAN polymer. Heat deflection temperature (HDT), surface gloss, impact strength, tensile strength and flexural strength were measured, and the result is shown in Table 3.

Example 18

A thermoplastic resin was prepared by the same method as example 15, except using di(t-butylperoxyisopropyl)benzene instead of dicumyl peroxide as a cross-linking additive. Heat deflection temperature (HDT), surface gloss, impact strength, tensile strength and flexural strength were measured, and the result is shown in Table 3.

Example 19

A thermoplastic resin was prepared by the same method as example 15, except using 2,5 dimethyl-2,5-di(t-butylperoxy) hexane instead of dicumyl peroxide as cross-linking additive. Heat deflection temperature (HDT), surface gloss, impact strength, tensile strength and flexural strength were measured, and the result is shown in Table 3.

Example 20

A thermoplastic resin was prepared by the same method as example 15, except using 2,5-dimethyl-2,5-di(t-butylperoxy)-3-hexyne instead of dicumyl peroxide as cross-linking additive. Heat deflection temperature (HDT), surface gloss, impact strength, tensile strength and flexural strength were measured, and the result is shown in Table 3.

Example 21

A thermoplastic resin was prepared by the same method as example 15, except using 1.0 parts by weight of dicumyl peroxide as a cross-linking additive. Heat deflection temperature (HDT), surface gloss, impact strength, tensile strength and flexural strength were measured, and the result is shown in Table 3.

Comparative Example 3

A thermoplastic resin was prepared by the same method as example 15, except not adding dicumyl peroxide as cross-linking additive. Heat deflection temperature (HDT), surface gloss, impact strength, tensile strength and flexural strength were measured, and the result is shown in Table 3.

Comparative Example 4

A thermoplastic resin was prepared by the same method as example 15, except adding 20 parts by weight of dicumyl peroxide as cross-linking additive. Heat deflection temperature (HDT), surface gloss, impact strength, tensile strength and flexural strength were measured, and the result is shown in Table 3.

TABLE 3

| Classification | Examples | | | | | | | Comparative Example | |
|---|---|---|---|---|---|---|---|---|---|
| | 15 | 16 | 17 | 18 | 19 | 20 | 21 | 3 | 4 |
| Heat deflection temperature (HDT, ° C.) | 100 | 100 | 105 | 101 | 100 | 100 | 98 | 99 | 100 |
| Surface gloss (Gloss, 45 degree) | 18 | 20 | 20 | 19 | 19 | 17 | 15 | 75 | 20 |
| Impact strength (kg cm/cm) | 17 | 17 | 15 | 15 | 18 | 18 | 13 | 22 | 4 |
| Tensile strength (kg/fcm$^2$) | 530 | 520 | 520 | 535 | 520 | 520 | 510 | 510 | 500 |
| Flexural strength (kg/fcm$^2$) | 890 | 880 | 870 | 880 | 890 | 880 | 880 | 810 | 900 |

As shown in Table 3, when compared to comparative example 3 not adding cross-linking additive and comparative example 4 excessively adding cross-linking additive, the thermoplastic resin composition of examples 15 to 21 prepared with a constant constitution of graft ABS polymer, heat-resistant copolymer, cross-linking additive according to the present invention was excellent in heat-resistance due to having a high or alike (example 7) heat deflection temperature (HDT), and excellent in low gloss property due to having a low surface gloss, and excellent in impact strength, tensile strength and flexural strength.

INDUSTRIAL APPLICABILITY

Thermoplastic resin according to the present invention is effective in processing of a colored heat resistant ABS resin by having an excellent cold stress whitening reduction and a strength property, without lowering other properties as well as giving excellence in hot-tool weldability, pigmentation and paint spread property which are more important in post process, and maintaining the mechanical property as well as giving an excellent heat-resistance and low gloss property.

While certain preferred embodiments and comparative examples of the present invention have been shown and described, it is to be distinctly understood that the invention is not limited thereto but may be otherwise variously embodied and practiced within the scope of the following claims.

What is claimed is:

1. A thermoplastic resin composition comprising:
   10 to 50 parts by weight of a graft ABS polymer comprising 40 to 70 parts by weight of conjugated diene rubber latex, 15 to 40 parts by weight of aromatic vinyl compound and 5 to 20 parts by weight of vinyl cyanide compound,
   50 to 90 parts by weight of a maleimide based copolymer, and
   0.01 to 10 parts by weight of a peroxide-based additive or cross-linking additive.

2. The thermoplastic resin composition according to claim 1, comprising
   20 to 40 parts by weight of graft ABS polymer,
   60 to 80 parts by weight of a maleimide based copolymer, and
   0.5 to 10 parts by weight of peroxide-based oxide.

3. The thermoplastic resin composition according to claim 1, comprising
   20 to 40 parts by weight of graft ABS polymer;
   60 to 80 parts by weight of a maleimide based copolymer,
   0.1 to 10 parts by weight of peroxide-based additive, and
   1.0 to 10 parts by weight of acryl-based resin.

4. The thermoplastic resin composition according to claim 1, comprising
   10 to 50 parts by weight of graft ABS polymer;
   50 to 90 parts by weight of a maleimide based copolymer selected from the group consisting of α-methyl styrene and acrylonitrile; and a maleimide based copolymer; and
   0.01 to 10 parts by weight of cross-linking additive.

5. The thermoplastic resin composition according to claim 1, wherein
   the average particle diameter of said conjugated diene rubber latex is from 2,500 to 5,000 Å,
   the gel content thereof is from 70 to 95%, and
   the swelling index thereof is 12 to 30.

6. The thermoplastic resin composition according to claim 1, wherein said aromatic vinyl compound is selected from the group consisting of styrene, α-methylstyrene, p-ethylstyrene, vinyltolune and derivative thereof.

7. The thermoplastic resin composition according to claim 1, wherein said vinyl cyanide compound is selected from the group consisting of acrylonitrile (AN), methacrylonitrile, ethacrylonitrile and derivative thereof.

8. The thermoplastic resin composition according to claim 1, wherein the graft ABS polymer is prepared by copolymerizing
   10 to 40 parts by weight of a polybutadiene rubber latex having an average particle diameter of from 2,500 to 3,500 Å and gel content of 70 to 80%;
   15 to 30 parts by weight of a polybutadiene rubber latex having an average particle diameter of 2,500 to 3,500 Å and gel content of 80 to 90%;
   15 to 30 parts by weight of aromatic vinyl compound; and
   0 to 25 parts by weight of vinyl cyanide compound.

9. The thermoplastic resin composition according to claim 1, wherein said graft ABS polymer is prepared by the following method comprising the steps of;
   (A) adding a rubber latex mixture of
      20 to 30 parts by weight of a polybutadiene rubber latex of which the average particle sizes is 2,500 to 3,500 Å and the gel content is 70 to 80% and
      20 to 30 parts by weight of a polybutadiene rubber latex of which the average particle sizes is 2,500 to 3,500 Å and the gel content is from 80 to 90%;
      5 to 10 parts by weight of an aromatic vinyl compound,
      5 to 10 parts by weight of a vinyl cyanide compound,
      0.1 to 0.5 parts by weight of potassium rosinate,
      0.1 to 1.0 parts by weight of a weight average molecular weight controlling agent and
      50 to 80 parts by weight of a deionized water, escalating the temperature of polymerization reactor from 40 to 60° C., and initiating polymerization by adding peroxide initiator primarily;
   (B) polymerizing by adding successively for 1 to 2 hrs an emulsion containing
      10 to 15 parts by weight of an aromatic vinyl compound,
      10 to 15 parts by weight of a vinyl cyanide compound,
      0.5 to 1.5 parts by weight of a potassium rosinate and
      20 to 30 parts by weight of deionized water, as escalating slowly the temperature of polymerization reactor from 60 to 70° C., at the point of 50 to 75% of monomer conversion rate, after going on 30 to 60 minutes from the initiation of the above polymerization;
   (C) adding a peroxide initiator secondly for 1 to 2 hrs continuously as simultaneously adding the emulsion continuously; and
   (D) adding in a lump an activating agent accelerating the initiation reaction and thirdly peroxide initiator, followed by adding the above emulsion (B) and the above peroxide initiator (C), and escalating the temperature of polymerization reactor from 70 to 80° C. for 1 to 2 hrs, and completing polymerization.

10. The thermoplastic resin composition according to claim 9, wherein said peroxide initiator is inorganic peroxide.

11. The thermoplastic resin composition according to claim 10, wherein said inorganic peroxide is potassium persulfate or sodium persulfate.

12. The thermoplastic resin composition according to claim 1, wherein said peroxide-based additive is selected from the group consisting of dicumyl peroxide, di-(t-butylperoxyisopropyl)benzene, 2,5-dimethyl-2,5-di(t-butylperoxy)hexane, and 2,5-dimethyl-2,5-di(t-butylperoxy)-3-hexyne.

13. The thermoplastic resin composition according to claim 1, wherein said cross-linking additive is selected from the group consisting of acrly peroxides, alkyl peroxides, hydroperoxides, peresters, azo compound, disulfide, or tetrazenes.

14. The thermoplastic resin composition according to claim 3, wherein said acryl-based resin is polymethylmethacrylate (PMMA) having from 50,000 to 200,000 of weight average molecular weight.

15. The thermoplastic resin composition according to claim 3, wherein said acryl-based resin is comprised of
   8 to 25 parts by weight of polybutadiene rubber latex,
   40 to 70 parts by weight of acrylic compound,
   15 to 30 parts by weight of aromatic vinyl compound and
   1 to 20 parts by weight of vinyl cyanide compound.

16. The thermoplastic resin composition according to claim 1, further comprising 0.1 to 5 parts by weight of lubricant and 0.1 to 1 parts by weight of antioxidant.

17. The thermoplastic resin composition according to claim 16, wherein said lubricant is selected from the group consisting of oxidized polyethylene wax, magnesium stearate and a mixture thereof.

* * * * *